US008245018B2

(12) United States Patent
Nguyen

(10) Patent No.: US 8,245,018 B2
(45) Date of Patent: Aug. 14, 2012

(54) PROCESSOR REGISTER RECOVERY AFTER FLUSH OPERATION

(75) Inventor: Dung Quoc Nguyen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 806 days.

(21) Appl. No.: 12/347,924

(22) Filed: Dec. 31, 2008

(65) Prior Publication Data

US 2010/0169622 A1 Jul. 1, 2010

(51) Int. Cl.
*G06F 9/30* (2006.01)
(52) U.S. Cl. ....................................................... 712/244
(58) Field of Classification Search .................. None
See application file for complete search history.

(56) References Cited

U.S. PATENT DOCUMENTS

| 5,892,936 | A | 4/1999 | Tran |
| 6,658,532 | B1 | 12/2003 | Horrigan |
| 7,194,603 | B2 | 3/2007 | Burky |
| 2004/0215938 | A1 | 10/2004 | Burky |
| 2005/0257035 | A1* | 11/2005 | Prasky et al. ................ 712/238 |

OTHER PUBLICATIONS

Patterson, David. Hennessy, John. "Computer Architecture: A Quantitative Approach". Morgan Kaufmann Publishers, Third Edition, 2003. pp. 184-189, 224-232, and A-4 to A-7.*

IBM—"Preventing Synergistic Processor Element Indefinite Stalls Resulting from Instruction depletion in the Cell Broadband Engine Processor for CMOS SOI 90 nm—Applications Note"—IBM Technology Reference Material (Feb. 2007); pp. 1-14.
NETCHIP—"Application Note AN 06: CRC Error Recovery and USB Retry Protocol"—Net Chip Technology, Inc. Mountain View (Jan. 1998); pp. 1-3.
Somani—"CPRE 545: Fault Tolerant Systems Checkpoint and Recovery"—Dept Computer Science and Engineering UC San Diego (Mar. 2002); pp. 1-12.
Soundararajan—"Fault Tolerant Memory in Processor—Super Computer on a Chip"—Duke University, Computer Science Dept (Apr. 2005); pp. 1-3.
Elnozahy—"A Survey of Rollback-Recovery Protocols in Message-Passing Systems", School of Computer Science, Carnegie Mellon University, Philadelphia, PA (Jun. 1999); pp. 1-40.
Sunada—"Fault Tolerance: Methods of Rollback Recovery", Technical Report CSL-TR-97-718 (Mar. 1997); pp. 1-51.

* cited by examiner

*Primary Examiner* — Robert Fennema
(74) *Attorney, Agent, or Firm* — Matt Talpis; Mark P Kahler

(57) ABSTRACT

An information handling system includes a processor that may perform general purpose register recovery operations after an instruction flush operation that an exception, such as a branch misprediction causes. The processor receives an instruction stream that may include multiple instructions that operate on a particular target register that stores instruction result information. The general purpose register may temporarily store instruction opcode and register bits information for use during dispatch, execution and other operations. The processor includes a recovery buffer unit for use during flush recovery operations. The processor may use recovery valid and recovery pending bits that correspond with each instruction during the register recovery from flush operation.

21 Claims, 10 Drawing Sheets

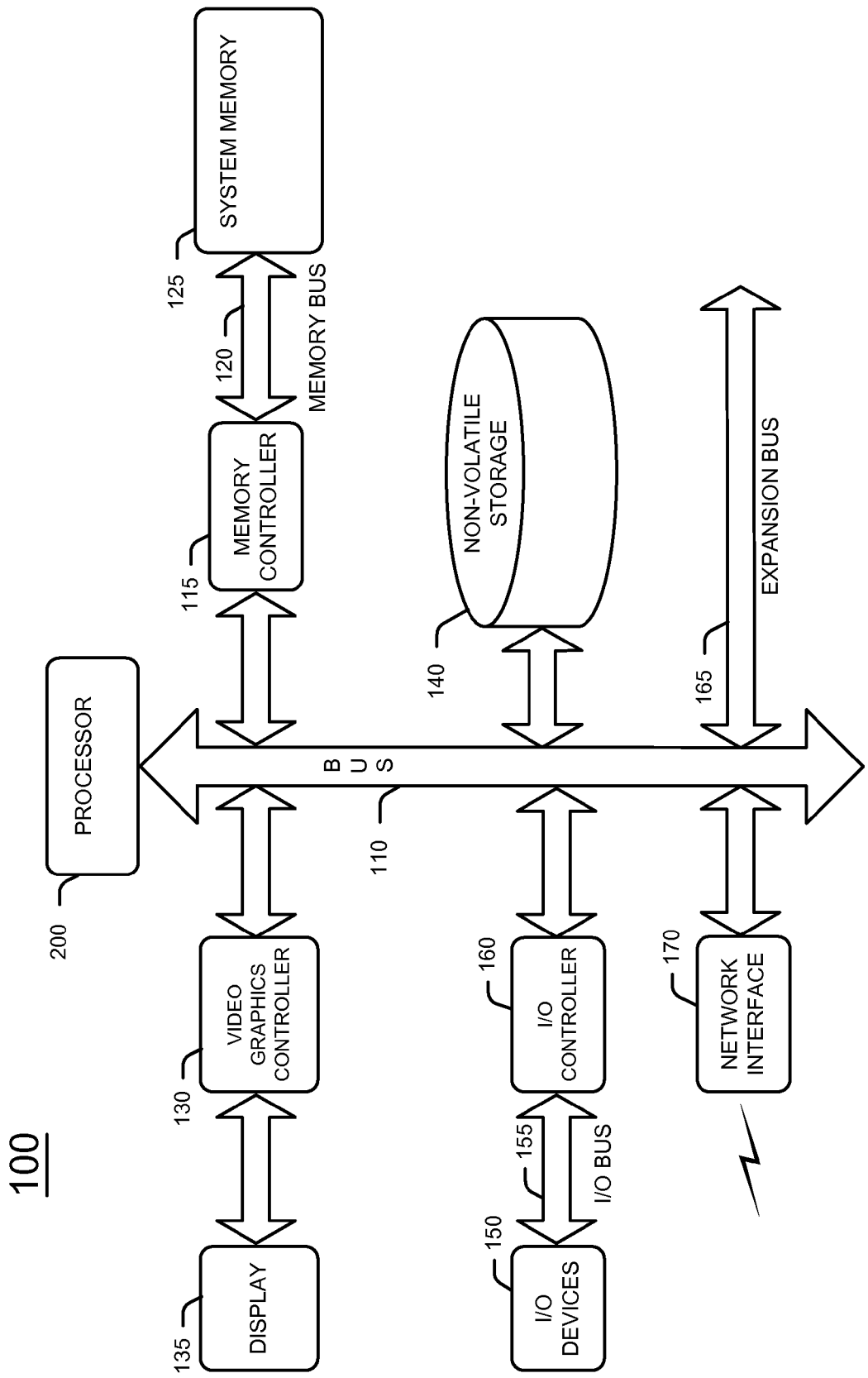

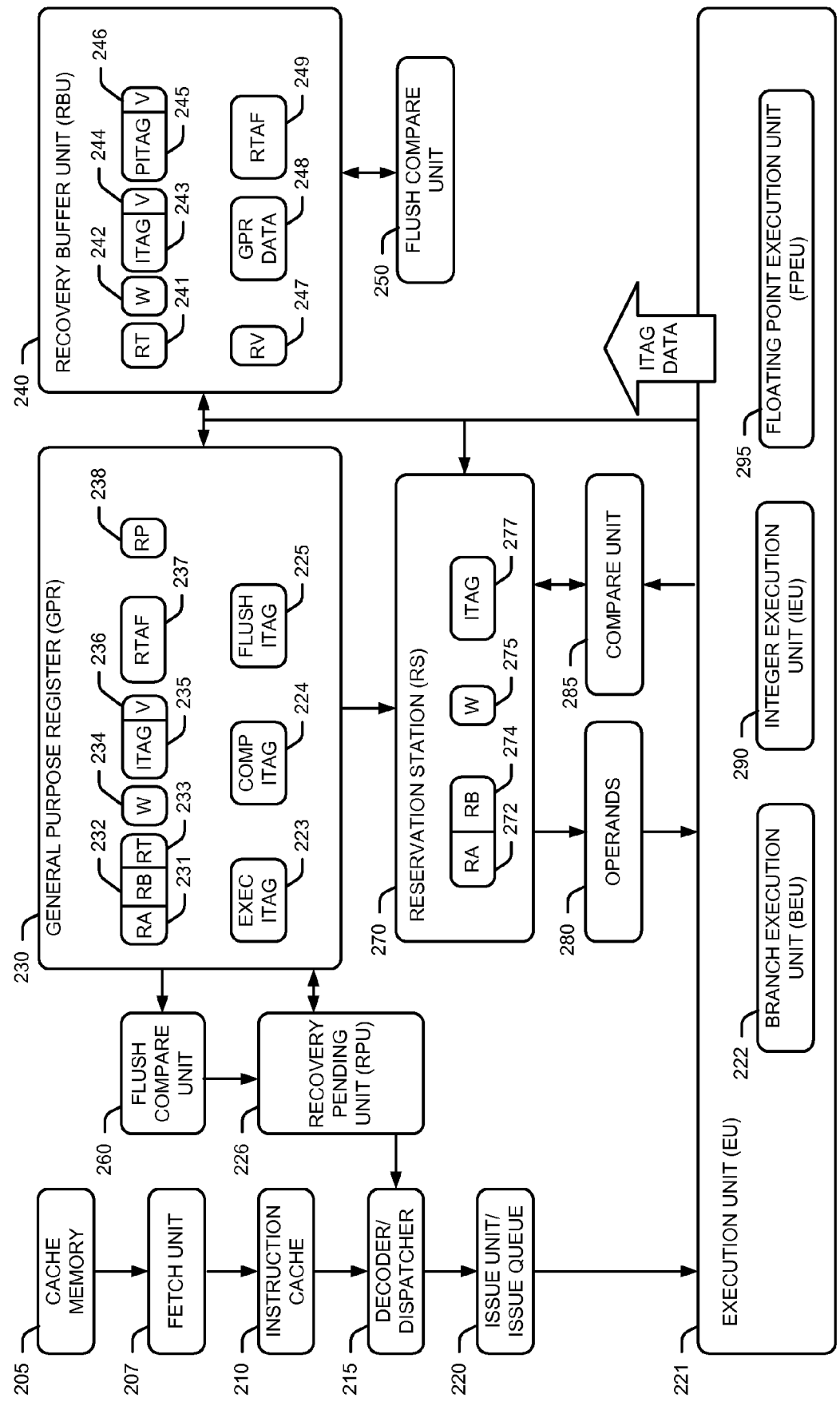

REGISTER RECOVERY
AFTER FLUSH METHOD

FIG. 4A
RESERVATION STATION INSTRUCTION ISSUE METHOD
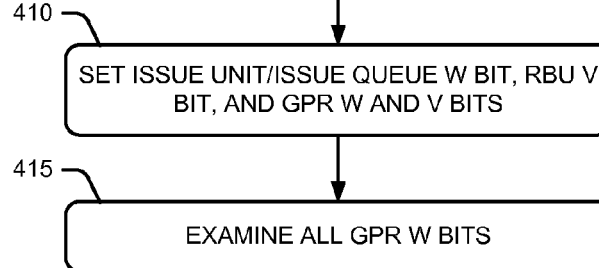
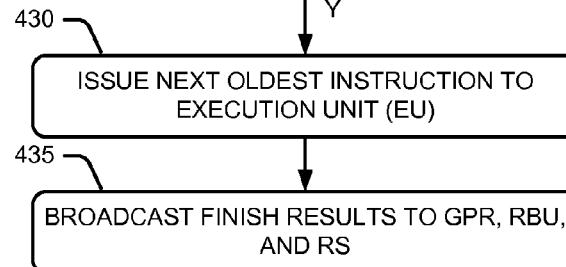
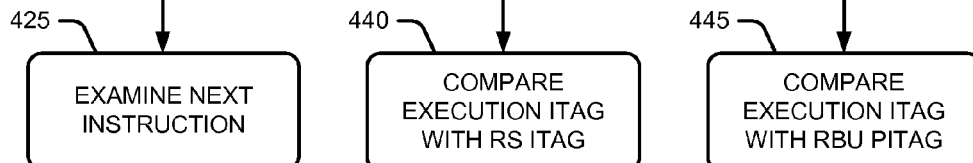

FLUSH OPERATION METHOD

STALL PENALTY REDUCTION METHOD

PROCESSOR REGISTER RECOVERY AFTER FLUSH OPERATION

BACKGROUND

The disclosures herein relate generally to processors, and more specifically, to processors that employ register recovery mechanisms after flush operations.

Modern information handling systems (IHSs) may track dependencies between instructions by using reservation station (RS) and recovery buffer units (RBU)s. Because out-of-sequence instruction handling is common in modern IHSs, processors typically track the dependencies between younger instructions and older instructions. If younger instructions depend on the results of older instructions, those younger instructions cannot complete until the results for the older instructions are available. During instruction dispatch, a general purpose register (GPR) may provide register A/register B (RA/RB) operand information that the reservation station (RS) receives. The recovery buffer unit (RBU) receives target register (RT) information from the GPR. The GPR may include all information that younger instructions need to track in case a younger instruction is dependent upon an older instructions execution results.

In the case of a flush operation, such as instruction branch flush, the IHS typically will recover to a state prior to the flush operation. The processor reads the RBU and moves data to the GPR to restore the GPR to a state or point prior to the flush. The instruction dispatch process may not resume until the GPR completely recovers from the flush event. In the case where multiple instructions write to the same target register (RT) location in the GPR, the recovery buffer unit (RBU) will contain multiple entries that reference the same target register (RT) location. During a flush there will be multiple RBU entries to read out of the recovery buffer unit (RBU) to restore a particular target register (RT) location with the proper data prior to the flush.

BRIEF SUMMARY

Accordingly, in one embodiment, a method of processing instructions is disclosed. The method includes fetching, by a fetch unit, a plurality of instructions from an instruction source. The method also includes decoding the plurality of instructions, by a decoder/dispatcher, the plurality of instructions including instructions that reference a target register of a general purpose register for storage of results thereof, the instructions that reference the target register including a current instruction and previous instructions. The method further includes dispatching, by a dispatcher, the plurality of instructions to an issue queue. The method still further includes issuing, by the issue queue, the plurality of instructions that reference the particular target register out-of-order to execution units.

The method also includes storing a respective entry in a recovery buffer unit for each of the previous instructions and the current instruction, the previous instructions and the current instruction referencing the same target register. The method further includes executing, by the execution units, the current instruction and the previous instructions. The method also includes determining, by a branch execution unit, if an exception occurred for one of the previous instructions that require an issue queue flush. The method further includes performing an issue queue flush if an exception occurred in the determining step. The method also includes performing, in response to the exception, a recovery buffer unit recovery to determine an oldest valid entry of the recovery buffer unit. The method further includes restoring the general purpose register to a known good state using a result of a target register corresponding to the oldest valid entry of the recovery buffer unit determined in the recovery buffer unit recovery.

In another embodiment, a processor is disclosed that includes a fetch unit that fetches a plurality of instructions from an instruction source. The processor also includes a decoder/dispatcher that decodes the plurality of instructions, the plurality of instructions including instructions that reference a target register of a general purpose register for storage of results thereof, the instructions that reference the target register including a current instruction and previous instructions. The decoder/dispatcher dispatches the plurality of instructions to an issue queue that is coupled to the decoder/dispatcher. The processor still further includes a general purpose register, coupled to the decoder/dispatcher that stores a state of the processor. The processor also includes a plurality of execution units, coupled to the issue queue, wherein the issue queue issues the plurality of instructions that reference the particular target register out-of-order to the execution units.

The processor further includes a recovery buffer unit, coupled to the general purpose register, that stores a respective entry for each of the previous instructions and the current instruction, the previous instructions and the current instruction referencing the same target register, wherein the execution units speculatively execute the current instruction and the previous instructions. The processor also includes a branch execution unit, coupled to the issue queue, that determines if an exception occurred for one of the previous instructions that requires an issue queue flush, wherein the issue queue performs an issue queue flush if the exception occurred. The recovery buffer unit, in response to the issue queue flush, performs a recovery buffer unit recovery to determine an oldest valid entry of the recovery buffer unit, the recovery buffer unit restoring the general purpose register to a known good state using a result of a target register corresponding to the oldest valid entry of the recovery buffer unit.

BRIEF DESCRIPTION OF THE DRAWINGS

The appended drawings illustrate only exemplary embodiments of the invention and therefore do not limit its scope because the inventive concepts lend themselves to other equally effective embodiments.

FIG. 1 is block diagram of an information handling system (IHS) that includes the disclosed processor register recovery after flush methodology.

FIG. 2 is a block diagram showing more detail of the processor that employs the register recovery after flush methodology.

FIGS. 4A-4B is a flowchart that shows process flow in the processor of FIG. 2 as it employs the disclosed reservation station instruction issue method.

DETAILED DESCRIPTION

Figure 3A:
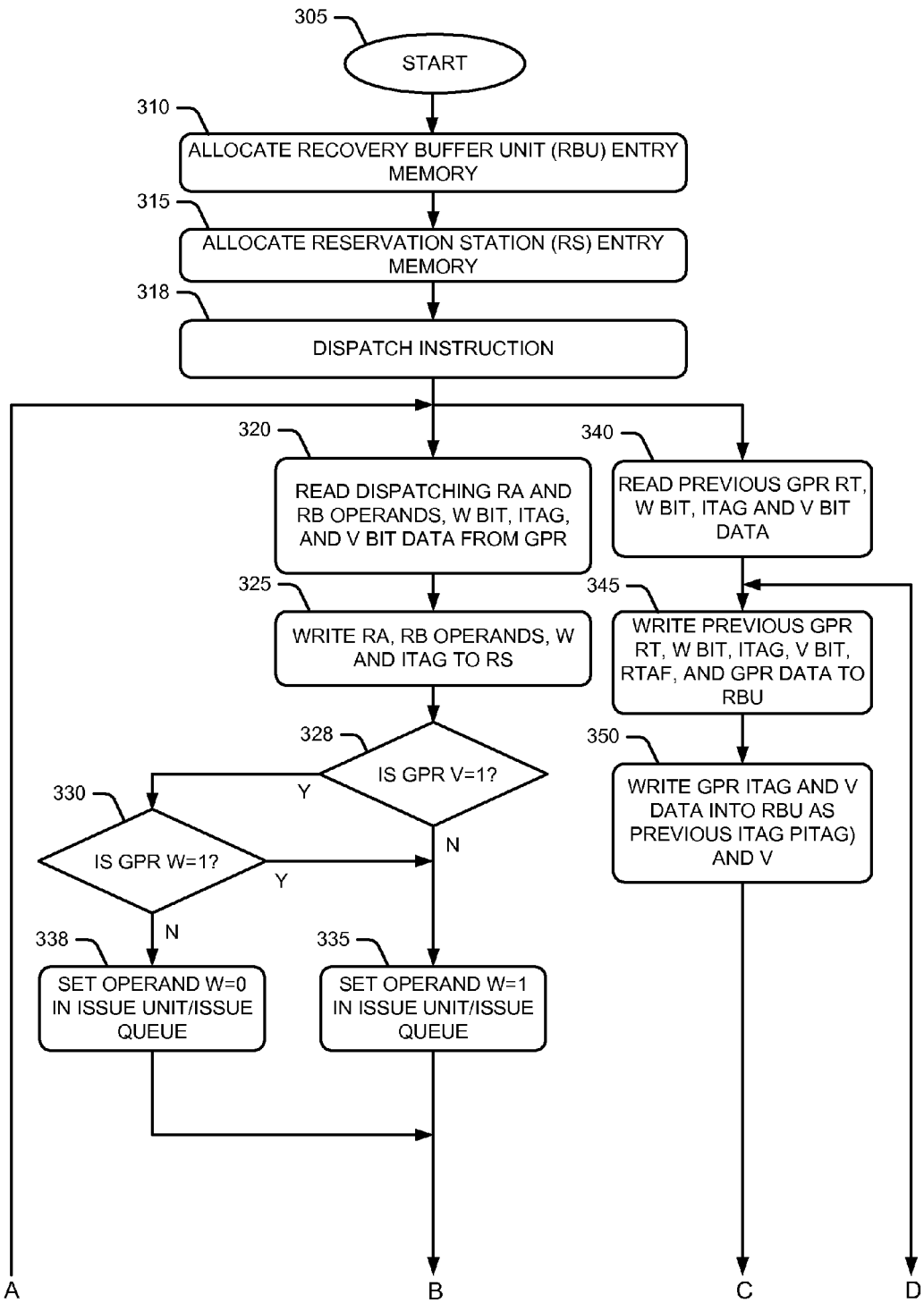
FIGS. 3A-3B show a flowchart that shows process flow in the processor of FIG. 2 as it employs the disclosed register recovery after flush method.

Modern processors often use operand reservation stations and a recovery buffer unit to manage general purpose register (GPR) data recovery after a flush. An exception, such as a branch misprediction, may necessitate a flush operation. As part of the flush operation, a processor may analyze all of the instructions of a recovery buffer unit. More particularly, in this flush operation, the processor may analyze all of the instructions of the recovery buffer unit, from the youngest instruction entry to the oldest instruction entry, to restore the general purpose register (GPR) to a known good data state just prior to the flush. The processor may consume a substantial amount of time to perform this analysis of instructions. GPR recovery time affects processor latency.

In one embodiment, the disclosed processor may employ a recovery buffer unit that stores pointers to instructions that correspond to entries of the recovery buffer unit. The recovery buffer unit may store instruction information, such as the target register (RT) data into which a particular instruction writes results. The processor may quickly analyze the pointers and target register data to determine an oldest target register (RT) that corresponds to the last known good state of the GPR prior to the exception and flush.

FIG. 1 shows an information handling system (IHS) 100 that may employ the disclosed register recovery after flush method. IHS 100 includes a processor 200 that couples to a bus 110. A memory controller 115 couples to bus 110. A memory bus 120 couples system memory 125 to memory controller 115. A video graphics controller 130 couples display 135 to bus 110. IHS 100 includes nonvolatile storage 140, such as a hard disk drive, CD drive, DVD drive, or other nonvolatile storage that couples to bus 110 to provide IHS 100 with permanent storage of information. Nonvolatile storage 140 is a form of data store. I/O devices 150, such as a keyboard and a mouse pointing device, couple via an I/O bus 155 and an I/O controller 160 to bus 110.

One or more expansion busses 165, such as USB, IEEE 1394 bus, ATA, SATA, eSATA, PCI, PCIE and other busses, couple to bus 110 to facilitate the connection of peripherals and devices to IHS 100. A network interface 170 couples to bus 110 to enable IHS 100 to connect by wire or wirelessly to other network devices. IHS 100 may take many forms. For example, IHS 100 may take the form of a desktop, server, portable, laptop, notebook, or other form factor computer or data processing system. IHS 100 may also take other form factors such as a personal digital assistant (PDA), a gaming device, a portable telephone device, a communication device or other devices that include a processor and memory.

FIG. 2 shows a processor 200 that may employ the disclosed register recovery after flush method. In that case, processor 200 performs the functional blocks of the flowchart of FIGS. 3A-3B described below that apply to the register recovery process. Processor 200 includes a cache memory 205 that may receive processor instructions from such as system memory 125, non-volatile storage 140, expansion bus 165, network interface 170, or other sources not shown in FIG. 2. Cache memory 205 couples to a fetch unit 207 that processor 200 employs to fetch multiple instructions from cache memory 205. Instructions may be in the form of an instruction stream that includes a series or sequence of processor program instructions. Fetch unit 207 couples to an instruction cache 210 to temporarily store the instruction stream for further processing by processor 200. Instruction cache 210 couples to a decoder/dispatcher 215 that provides decoding and dispatching of instructions as the resources of processor 200 become available.

Decoder/dispatcher 215 couples to an issue unit/issue queue 220 that issues instructions for execution to execution units. Issue unit/issue queue 220 employs multiple execution units (EU)s for execution of instructions in processor 200.

Issue unit/issue queue 220 couples to EU 221 that includes multiple execution units. EU 221 includes branch execution unit (BEU) 222, integer execution unit IEU 290, floating point execution unit (FPEU) 295, and other EUs not shown. Multiple EUs may provide processor 200 with multi-processing or parallel instruction processing capability.

EU 221 may provide instruction tag (ITAG) information in the form of a broadcast or communication to other units of processor 200. As shown by the "ITAG DATA" arrow from EU 221 to units within processor 200, EU 221 provides instruction tag or ITAG data in the form of broadcast communications. For example, execution units of EU 221, namely IEU 290, and FPEU 295 broadcast an execution ITAG or EXEC ITAG 223 to GPR 230, RS 270, RBU 240, and BEU 222. In other words, IEU 290, and FPEU 295 of processor 200 broadcast execution ITAG and other results to GPR 230, reservation station RS 270, recovery buffer unit RBU 240, and BEU 222. The BEU 222 is responsible for instruction completion and providing completion instruction tag COMP ITAG 224 and flush instruction tag or FLUSH ITAG 225 data to GPR 230. In one embodiment, BEU 222 broadcasts COMP ITAG 224 and FLUSH ITAG 225 data to GPR 230, RS 270, RBU 240.

An instruction tag register or ITAG stores pointer address data for a particular instruction. For example, decoder/dispatcher 215 may dispatch the particular instruction that fetch unit 207 reads from IHS 100 memory. The particular instruction may reside in system memory 125 or other memory of IHS 100 during processor 200 fetch operations. The ITAG data, such as COMP ITAG 224 is a register that stores pointer information that may provide processor 200 with the particular instruction information store. The EXEC ITAG 223 is a register that may store the currently executing ITAG information for processor 200, whereas COMP ITAG 224 is a register that may store the last complete instruction ITAG data.

FLUSH ITAG 225 may store the last instruction ITAG prior to a flush operation in processor 200. Instructions may not always execute in the same order that they dispatch from decoder/dispatcher 215 or issue from issue unit/issue queue 220. It is common for instructions to execute "out of order". This out of order execution provides challenges, particularly when processor 200 flushes instruction cache 210 for any reason. One such reason for a flush may be a look-a-head branch misprediction fault and subsequent instruction cache 210 flush. A recovery pending unit (RPU) 226 couples to decoder/dispatcher 215. The output of decoder/dispatcher 215 couples to RPU 226 to provide register information thereto. RPU 226 may include RA and RB registers (not shown) for storage of RA/RB operand information and other information pertaining to processor 200 instructions. The output of decoder/dispatcher 215 also couples to a general purpose register (GPR) 230.

During instruction dispatch, namely operation of decoder/dispatcher 215, instruction register information stores in RPU 226 and GPR 230. For example, an executing instruction may write data into a particular register of GPR 230. GPR 230 may store multiple registers such as a register A (RA) 231, a register B (RB) 232, or a target register (RT) 233 that the output of a particular instruction writes into. An example may be an instruction that requires the addition of the contents of registers RA 231 and RB 232 (i.e. RA 231+RB 232) and places the result in target register RT 233. RT 233 may store an entry for each instruction that writes data thereto. GPR 230 also includes registers W 234, RT address field RTAF 237, ITAG 235 and V 236 to store instruction information specific to a particular instruction during dispatch.

During an instruction, dispatch processor 200 stores an entry write bit (W) 234, RTAF 237 data, an instruction tag (ITAG) 235, and a valid bit (V) 236 in general purpose register (GPR) 230. In this document, the bit that a particular register stores may also identify the register that stores that bit. For example, W register 234 stores an entry write bit W. The RTAF 237 data identifies the particular register in GPR 230 that receives current instruction results. ITAG register 235 stores an instruction tag (or ITAG) and V register 236 stores a valid bit (V). The entry write bit W and valid bit V information are specific to the particular instruction currently dispatching. In other words, W 234 and V 236 represent entry write bit data and valid bit data, respectively, for the particular ITAG 235 instruction pointer. A pointer is an address of an instruction as opposed to the instruction itself. In one example, a W 234 bit=1 indicates that an instruction data result resides in GPR 230. In contrast, a W 234 bit=0 indicates that instruction data does not reside in GPR 230, or that the instruction is not yet complete.

To support a register recovery from a flush, processor 200 stores RA and RB register information in RPU 226 during the same instruction dispatch operation described above. RPU 226 may store multiple instruction RA/RB data (not shown) to support recovery of GPR 230 to a particular state of processor 200 following a flush operation. ITAG 235 stores an instruction pointer to the instruction or opcode that writes to RT 233. For purposes of this example, GPR 230 may represent one particular state of processor 200, and more particularly, information for the current instruction.

Processor 200 employs a recovery buffer unit (RBU) 240 that provides data for use after a flush. GPR 230 couples to RBU 240 to provide register bit information on a per instruction basis. For example, GPR 230 may write register bit information to RBU 240 during instruction dispatch and RBU 240 may write register bit information to GPR 230 during flush recovery. Recovery buffer unit (RBU) 240 includes a group of registers, namely RT 241, W 242, ITAG 243 and V 244. RBU 240 also includes a previous instruction tag (PI-TAG) register 245, a GPR DATA 248, RT address field RTAF 249, and a valid bit (V) register 246. Registers W 242, ITAG 243 and V 244 store instruction information about the newest or younger instruction of instructions dispatching in processor 200. Registers PITAG 245, RT 241, and V 246 store instruction information for the previous or older instruction of instructions dispatching in processor 200. PITAG 245 includes instruction pointer information about an instruction previous to the ITAG 243 instruction pointer information. RT 241 points to GPR 230 entry data that RBU 240 restores during a flush operation.

Multiple instructions that decoder/dispatcher 215 dispatches may each seek to update a particular register location in GPR 230, such as RT 233. During instruction dispatch and execution, multiple temporary RT data, namely RT 241 entries may reside in RBU 240 or other memory of IHS 100 and upon completion of multiple instructions resolve to a single RT 233 entry. In one embodiment, during a flush, only one of those temporary RT 241 entries is valid. One embodiment of the disclosed methodology describes a process to identify one entry of RT 241 from multiple RT entries in recovery buffer unit 240 to recover after a flush. During dispatch, a particular instruction may write information into RT 233 of GPR 230. During that same process, ITAG 235 information will also be written to provide a pointer to that particular instruction. If a younger instruction is reading the RT 233 data, the younger instruction will also read the ITAG 235 data and wait for that ITAG 235 instruction to complete and produce results before the younger instruction completes.

Recovery buffer unit (RBU) 240 includes a recovery valid (RV) register for RV bit 247. The RV bit of RV 247 provides information that processor 200 uses to determine which RBU entries support the recovery of GPR 230 after a flush. GPR 230 includes a recovery pending bit RP 238. RP 238 is a bit or flag that corresponds to a particular entry in GPR 230. RP 238 may indicate that the particular entry in GPR 230 requires an RBU recovery operation in response to the instruction queue flush operation. Processor 200 interprets the data of RBU 240 and using RV 247, and other bit data, determines that RBU entry to supply data for GPR 230 recovery.

During dispatch, when a particular current instruction accesses RT 233, processor 200 reads RT 233, GPR 230 data at that RT 233 location, W 234, ITAG 235, and the V 236 register and stores that data into RBU 240. Processor 200 also stores the previous instruction's ITAG information in the PITAG 245 register of recovery buffer unit RBU 240, along with V 246 register data. In this manner, RBU 240 stores the original or previous result data at location RT 241 from the previous instruction PITAG 245 and the previous ITAG information PITAG 245. RBU 240 also stores the particular current or younger instruction data at location RT 241 from the current instruction pointer ITAG 243.

RBU 240 includes multiple registers that each store multiple data entries for instructions that write to target register RT 233. Registers ITAG 243 and PITAG 245 of RBU 240 each couple to a flush compare unit 250 to provide current and previous instruction pointer information thereto. Flush compare unit 250 couples to recovery valid (RV) register 247 to provide recovery validity register data from comparison of ITAG 243 and PITAG 245 information. When a flush occurs, flush compare unit 250 compares ITAG 243 and PITAG 245 data.

If ITAG 243 is the same or younger than the flush ITAG 225, and PITAG 245 is also the same or younger than flush ITAG 243, processor 200 determines that the RBU 240 data will not require recovery after the flush. If ITAG 243 is the same or younger than flush ITAG 243, and PITAG 245 is older than flush ITAG 225, the processor 200 determines that the RBU 240 will require recovery after the flush. However, if both ITAG 243 and PITAG 245 are older than flush ITAG 225, the RBU 240 data will not require recovery after the flush operation. RBU 240 stores one entry per instruction, thus RV 247 stores one recovery valid bit per instruction.

The RV 247 bit is set =0 at flush time for any entries that processor 200 does not require for recovery. RV 247 is set =1 at flush time for any entries that processor 200 requires for recovery. If RV 247 bit=1, processor 200 reads instruction register data from RBU 240 and writes that data into GPR 230 registers. Processor 200 may perform a compare of all RT and ITAG entry data in RBU 240. In other words, in one embodiment, flush compare unit 250 may compare all instructions that perform a write to RT 241 and flush only those instructions that specifically update RT 241. In this manner, only the oldest RT entry that processor 200 does not flush will need recovery in RBU 240. Recovery buffer unit RBU 240 may be read from youngest instruction to oldest, or from oldest instruction to youngest order during recovery.

ITAG 235 of GPR 230 couples to a flush compare unit 260. Flush compare unit 260 couples to RPU 226 to provide flush status for GPR 230. At the start of a flush, flush compare unit 260 sends a flush signal to RPU 226 to instruct RPU 226 that GPR 230 is now recovering from a flush. In one embodiment, any instructions of processor 200 that exhibit dependencies to GPR 230 wait until the recovery process completes before completing execution. After the GPR 230 register recovery process completes, instructions with dependencies to GPR 230 may complete execution as well.

In one embodiment, GPR 230 provides register RA 231 and RB 232 information to operand reservation station (RS) 270 to provide register RA 272 and register RB 274 data. Registers W 234 and ITAG 235 couple respectively to a W register 275 and an ITAG register 277 to provide instruction register information for temporary storage and analysis during flush recovery. Reservation station (RS) 270 couples to an operands 280 register to provide RA and RB register data that each originate from registers RA 231 and RB 232 of GPR 230. Operands register 280 couples to EU 221 and provides RA 231 and RB 232 data to BEU 222, an integer execution unit (IEU) 290, and a floating point execution unit (FPEU) 295. W register 275 and ITAG register 277 each couple to a compare unit 285. Compare unit 285 couples to RS 270 to provide compare results of instruction ITAG information during multiple instruction dispatch, decode, issue and execution operations of processor 200. EU 221 couples to compare unit 285, RS 270, GPR 230, and RBU 240. Issue unit 220 couples to EU 221, including BEU 222, IEU 290, and FPEU 295. BEU 222, IEU 290 and FPEU 295 include the group of execution units for processor 200.

Figure 3B:
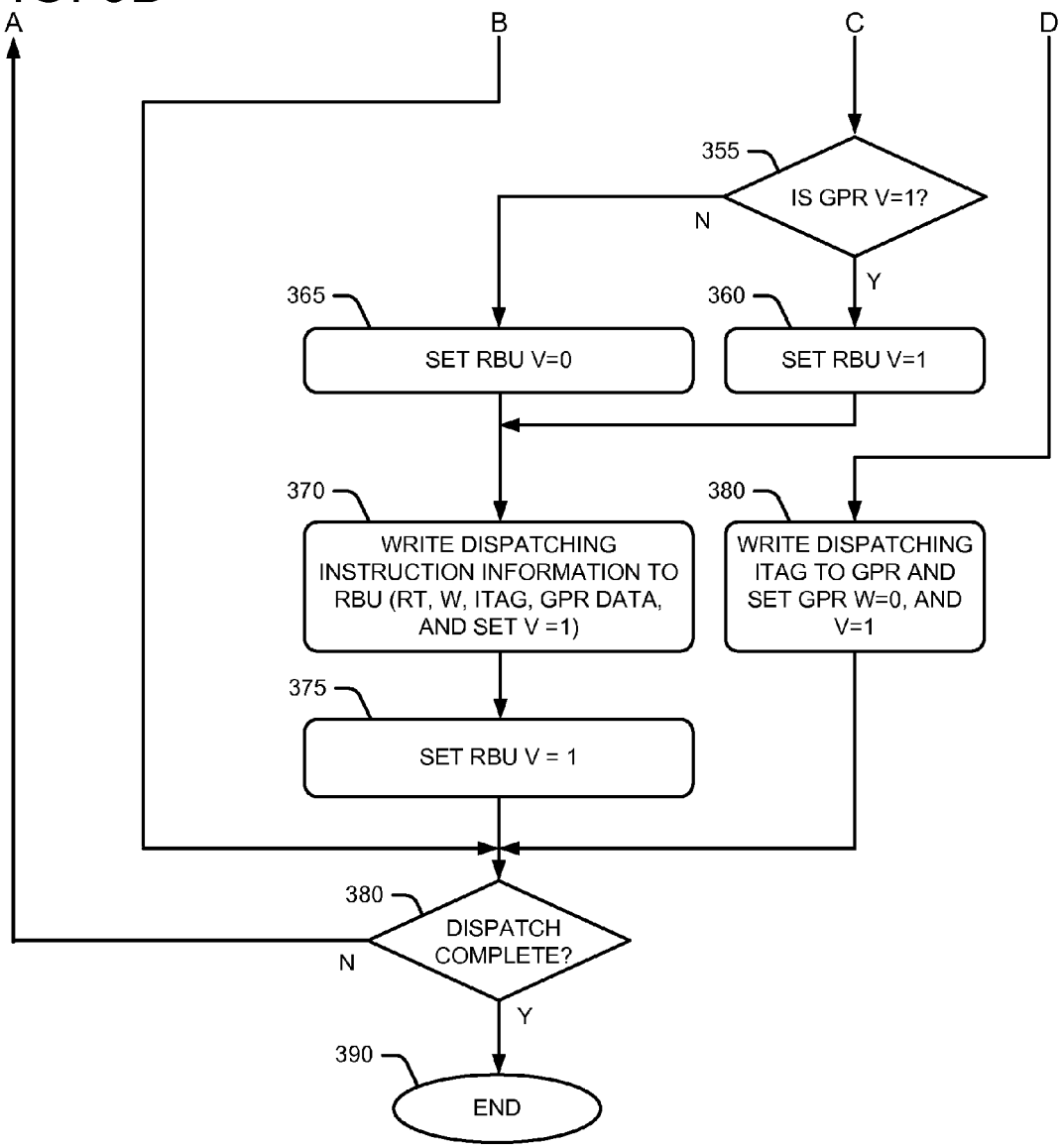

FIGS. 3A-3B show a flowchart that describes one example of the disclosed register recovery after flush method. The register recovery after flush method starts, as per block 305. Processor 200 of IHS 100 allocates recovery buffer unit (RBU) 240 entry memory, as per block 310. That allocation provides register memory space for a dispatching instruction for each register entry for RBU 240, such as those of registers RT 241, W 242, ITAG 243, V 244, PITAG 245, V 246 and RV 247. Processor 200 allocates reservation station (RS) 270 entry memory, as per block 315. That allocation provides memory space for the dispatching instruction in reservation station RS 270. Decoder/dispatcher 215 dispatches a particular instruction in a sequence of instructions from instruction cache 210, as per block 318. Processor 200 reads RA 231, RB 232, W 234, ITAG 235, and V 236 data from GPR 230 for the particular dispatching instruction, as per block 320.

Processor 200 writes RA 272, RB 274, W 275, and ITAG 277 data into reservation station (RS) 270, as per block 325. Processor 200 reads the V 236 valid bit data from GPR 230 to determine if that bit is set to 1, as per block 370. If V 236 is set to 1, processor 200 reads the W 234 bit from GPR 230 to determine if that bit is set to 1, as per block 330. If the GPR 230 V 236 bit is not equal to one, then processor 200 sets W bit=1 in issue unit/issue queue 220 for the currently issuing instruction, as per block 335. If the GPR 230 W 234 is not =1, processor 200 sets the W bit=0 in issue unit/issue queue 220 for the currently issuing instruction, as per block 338. If GPR 230 V 236 bit is =1 and GPR 230 W 234 bit=1, then processor 200 sets the W bit=1 in issue unit/issue queue 220, as per block 335. After dispatching the instruction at block 318, processor 200 reads RT 231, RB 232, W 234, ITAG 235, and V 236 data from GPR 230 for the previous instruction, as per block 340.

Processor 200 writes RBU 240 data, namely RT 241, W 242, ITAG 243, V 244, RTAF 249, and GPR DATA 248 from previous instruction data, as per block 345. Processor 200 writes GPR 230 ITAG 235 data into RBU 240 PITAG 245 and V 246 registers as previous instruction information, as per block 350. Processor 200 performs a test to see if GPR 230 V 236=1, as per block 355. If the V 236 bit of GPR 230 for the dispatching instruction is equal to 1, then V 246 of RBU 240 is set to 1, as per block 360. If the V 236 bit of GPR 230 for the dispatching instruction is not equal to 1, then V 246 of RBU 240 is set to 0, as per block 365. Once the V 246 bit is set to either 1 or 0, processor 200 writes the dispatching instruction information into RBU 240, (RT 241, W 242, ITAG 243, V 244, and GPR DATA 248), as per block 370. Processor 200 also writes the V 244 bit=1, as per block 370.

Processor 200 sets V 244=1 in RBU 240, as per block 375. After the GPR 230 read per block 340 above, processor 200 writes dispatching instruction ITAG information, into GPR 230 ITAG 235 register and sets W 234=0, and V 236=1, as per block 380. Processor 200 performs a test to determine if dispatch is complete, as per block 380. If dispatch is not complete, processor 200 performs an instruction dispatch, as per block 318. However, is dispatch is complete, the disclosed register recovery after flush method ends, as per block 390.

Figure 4B:
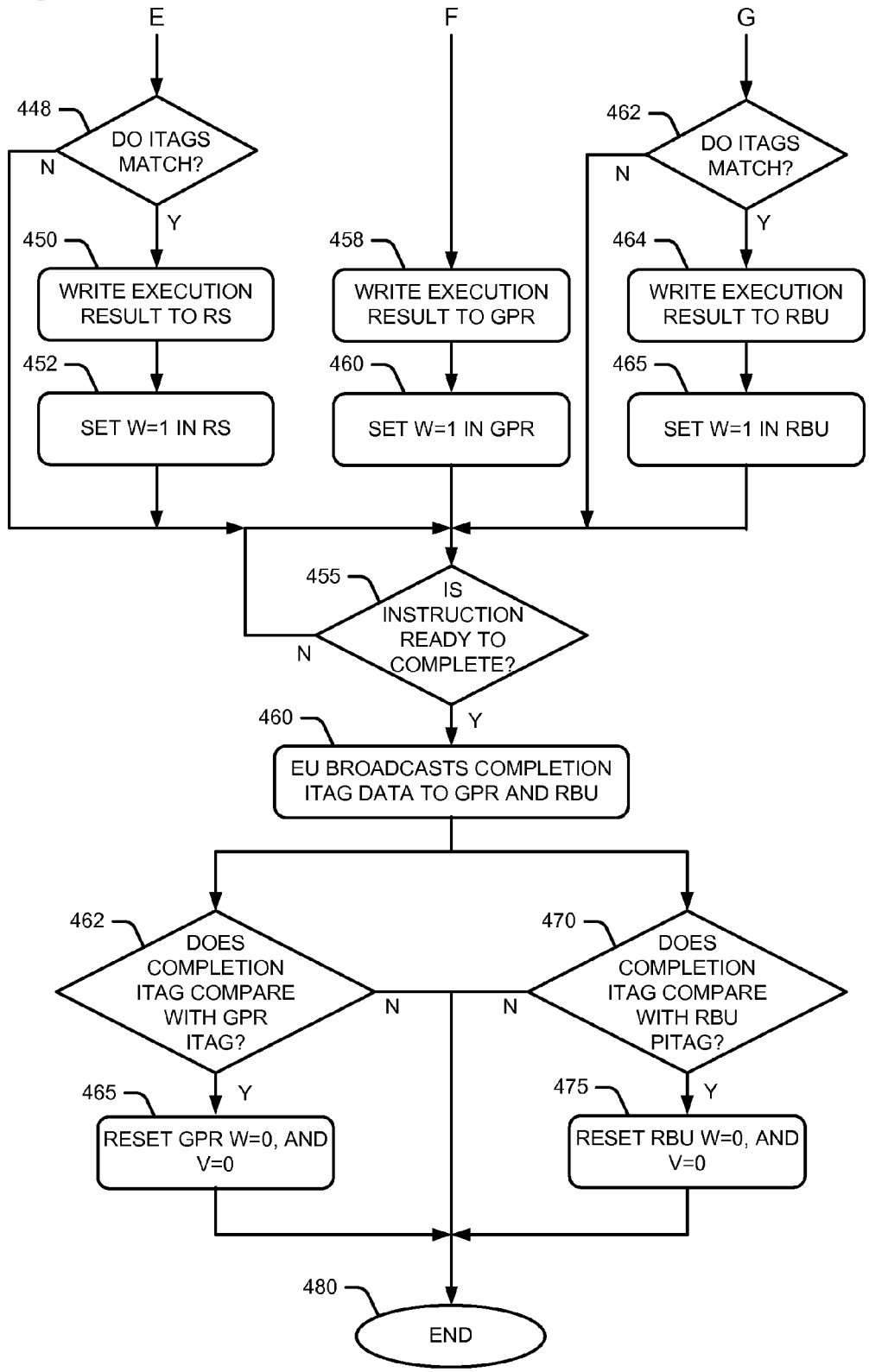

FIGS. 4A-4B show a flowchart that describes one example of the disclosed reservation station instruction issue method. The reservation station instruction issue method starts, as per block 405. Processor 200 sets issue unit/issue queue 220 W bit, RBU 240 V 244 bit, and GPR 230 W 234 and V 236 bits, as per block 410. Processor 200 sets the register bits of issue unit/issue queue 220, RBU 240, and GPR 230 following a register recovery operation, such as described in FIGS. 3A-3B above. Processor 200 examines each GPR 230 W 234 bit simultaneously, as per block 415. For example, each instruction operand includes a W 234 bit for RA 231 and a W 234 bit for RB 232.

Processor 200 performs a test to determine if W 234=1 for all instruction operands of GPR 230, as per block 420. When both of these W bits, namely RA 231 and RB 232 are equal to 1 then the instruction is ready to issue for execution. If all issue unit/issue queue 220 instructions operands do not equal 1, processor 200 examines the next inspection, as per block 425. If all W 234 bits of any particular instruction are =1, then that particular instruction is ready for issue. Processor 200 selects the next oldest ready instruction for issue to EUs, such as BEU 222, IEU 290, and FPEU 295. Processor 200 executes the next oldest instruction to EU 221, as per block 430. EU 221 broadcasts finish execution ITAG to GPR 230, RBU 240, RS 270, and BEU 222 as per block 435.

Following instruction execution, compare unit 285 compares execution ITAG information for executing instruction EXEC ITAG 223 with ITAG 277 of RS 270, as per block 440. Compare unit 285 compares EXEC ITAG 223 of executing instruction with ITAG 243 and PITAG 245 of RBU 240, as per block 445. In one embodiment, BEU 222 examines the finishing instruction to determine if that finishing instruction is the oldest instruction for completion. If the finishing instruction is eligible for completion, BEU 222 completes the instruction and sends the completion ITAG to GRP 230 and RBU 240.

After the next instruction examination, as shown in block 425, processor 200 performs a test to determine if the EXEC ITAG 223 and RS 270 ITAGS match, as per block 448. If the ITAG match is true, processor 200 writes the results of EU 221 into RS 270, as per block 450. Processor 200 sets W 275=1 in RS 270, as per block 452. However, if the ITAG match test is not true, processor 200 performs a test to determine if the current instruction is ready to complete, as per block 455. Following the ITAG compare per block 440, processor 200 writes results instruction execution results into GPR 230 using RTAF 237 as the index address into GPR 230, as per block 458. The W 234 bit in the corresponding RT 233 location is set =1, as per block 460. In that manner, the GPR 230 instruction execution results location is available for younger dispatching instruction use.

Processor 200 performs a test to determine if EXEC ITAG 223 and RBU 240 ITAGS match, as per block 462. If the ITAG match is true, processor 200 writes the results of EU 221 to RBU 240, as per block 464. Processor 200 sets W 242=1 in RBU 240, as per block 465. If the instruction is ready to complete, BEU 222 broadcasts completion ITAG data to GPR 230 and RBU 240, as per block 460. However, if the instruction is not ready to complete, processor 200 continues testing for instruction completion, as per block 455. EU 221 broadcasts completion COMP ITAG 224 data to GPR 230 and RBU 240, as per block 460. Compare unit 285 performs a test to determine if COMP ITAG 224 from BEU 222 compares with GPR 230 ITAG 235, as per block 462. If COMP ITAG 224 compares with ITAG 235, processor 200 resets both W 234=0, and V 236=0 of GPR 230, as per block 465.

Compare unit 285 performs a test to determine if COMP ITAG 224 from BEU 222 compares with RBU 240 PITAG 245, as per block 470. If COMP ITAG 224 compares with PITAG 245, processor 200 resets both W 242=0, and V 244=0 of RBU 240, as per block 475. However if the COMP ITAG 224 from BEU 222 does not compare with RBU 240 PITAG 245, or following the reset of W 242 and V 244 bits, the disclosed reservation station instruction issue method ends, as per block 480.

Figure 5A:
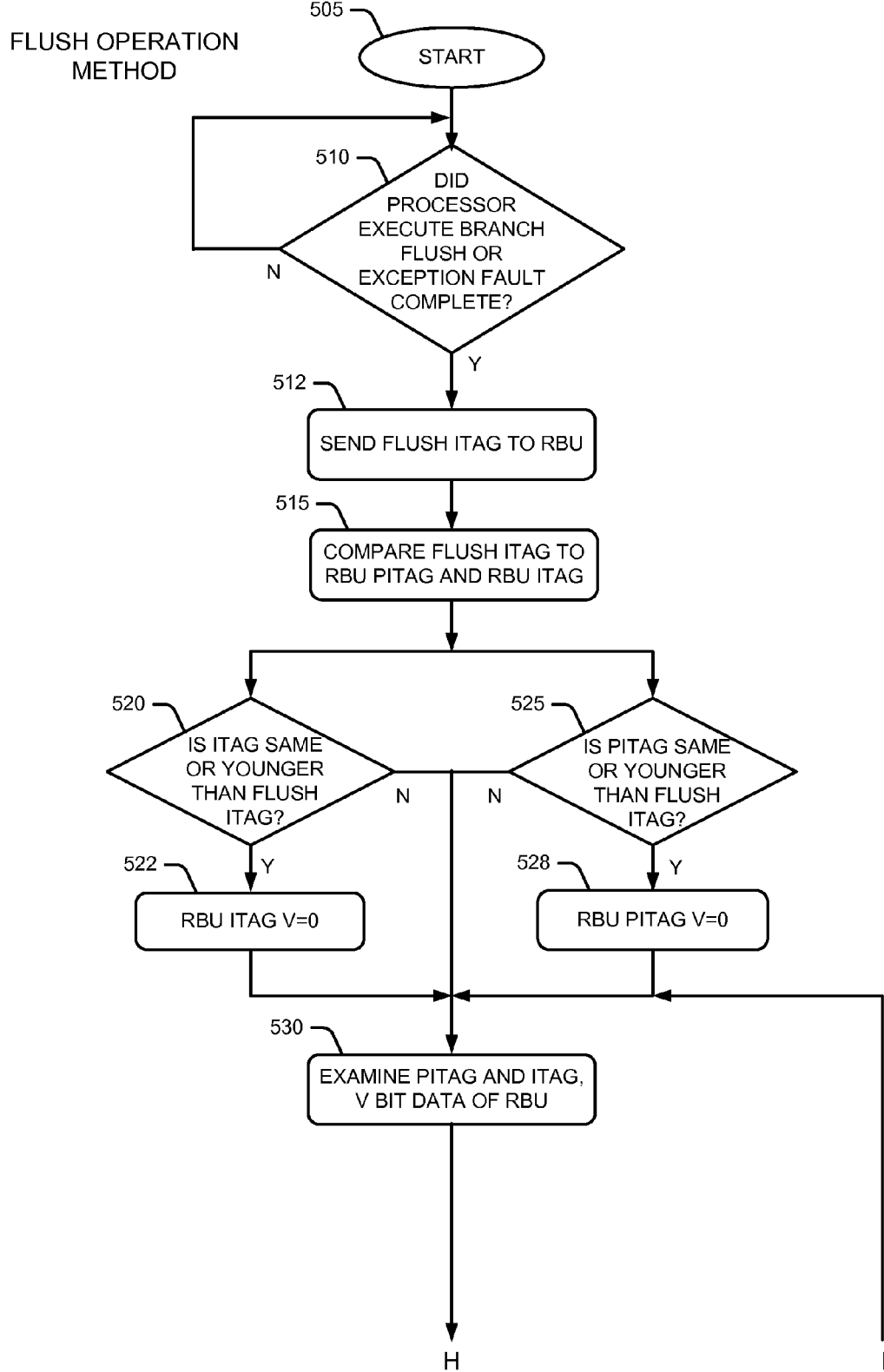
FIGS. 5A-5B show a flowchart that shows process flow in the processor of FIG. 2 as it employs the disclosed flush operation method.
Figure 5B:
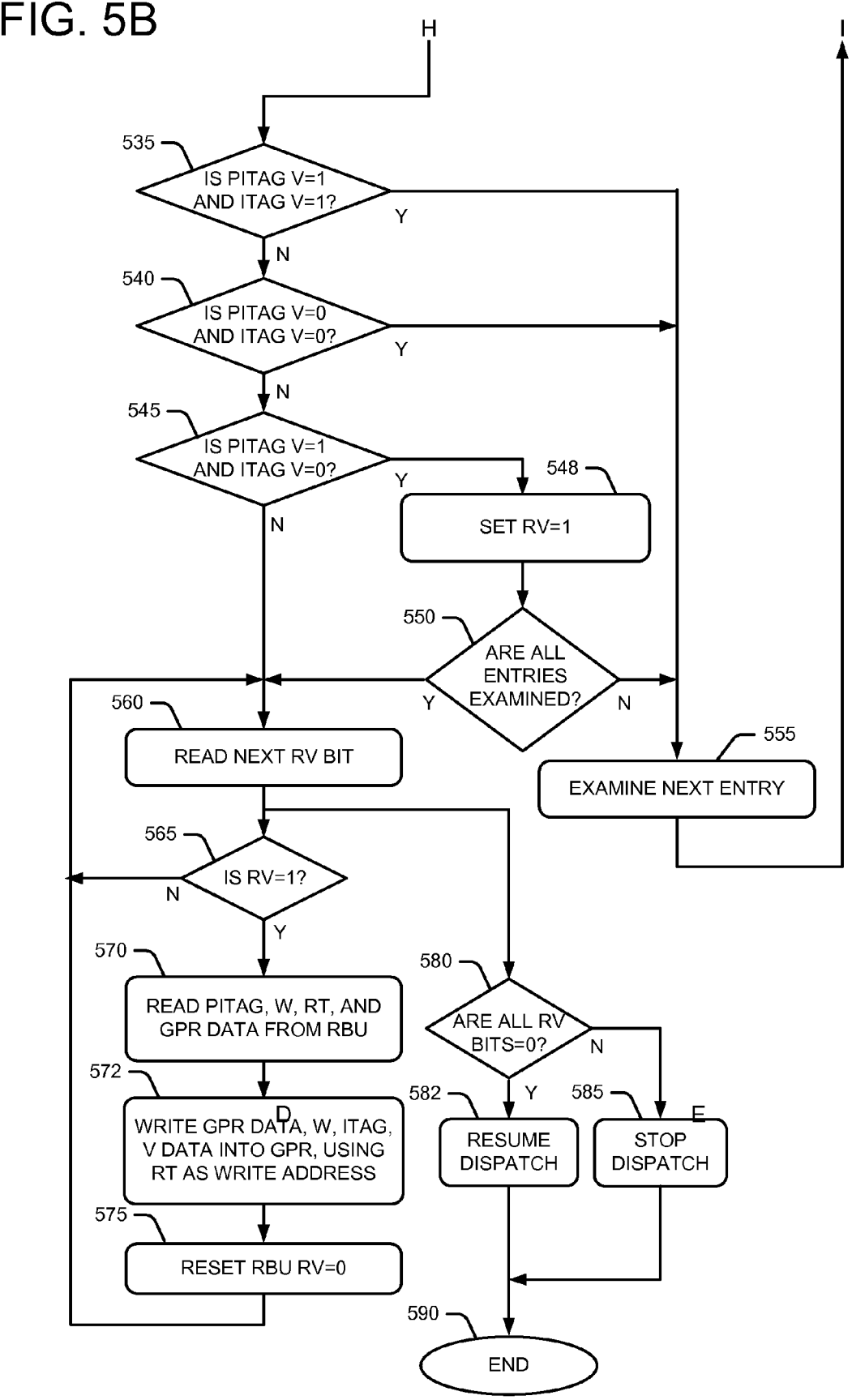

FIGS. 5A-5B show a flowchart that describes one example of the disclosed flush operation method. The flush operation method starts, as per block 505. Processor 200 performs a test to determine if a execute branch flush or exception fault operation completed, as per block 510. If neither operation completed, processor 200 sends FLUSH ITAG to RBU 240, as per block 512. Processor 200 compares FLUSH ITAG 225 to RBU 240 PITAG 245 and RBU 240 ITAG 243, as per block 515. Processor 200 performs a test to determine if ITAG 243 is the same as or younger than FLUSH ITAG 225, as per block 520. In other words, processor 200 determines which of each instruction of ITAG 243 and FLUSH ITAG 225 is older, younger or the same.

If processor 200 determines that ITAG 243 is the same as or younger than FLUSH ITAG 225, then processor 200 resets V 244 of RBU 240=0 and flow continues, as per block 522. Processor 200 may initiate a branch flush operation and exception fault operation. BEU 222 will monitor such operations and may initiate a flush request. During a flush operation, BEU 222 sends a FLUSH ITAG 225 to RPU 226, GPR 230, RBU 240, and RS 270. FLUSH ITAG 225 initiates or communicates a flush operation to RBU 240 and other units of processor 200, such as flush compare unit 260. RS 270 compares FLUSH ITAG 225 to all RS 270 ITAGs. If any ITAGs match, as described below, the valid V 246 bit for that entry is reset =0 to indicate that the flush operation for RS 270 is complete. In that manner, RS 270 is available for younger dispatching instructions.

Processor 200 performs a test to determine if PITAG 245 is the same as or younger than FLUSH ITAG 225, as per block 525. In other words, processor 200 determines which of each instruction of ITAG 243 and FLUSH ITAG 225 is older, younger or the same. If processor 200 determines that PITAG 245 is the same as or younger than FLUSH ITAG 225, then processor 200 resets V 246 of RBU 240=0, and flow continues, as per block 525. However, if the ITAG 243 or PITAG 245 tests per blocks 350 and 525 indicate that the ITAG is not the same or younger than FLUSH ITAG 225, processor 200 examines PITAG V 246 and ITAG V 244 data of RBU 240, as per block 530.

Processor 200 performs a test to determine the values of PITAG 245 V 246 and ITAG 243 V 244. If PITAG 245 V 246=1 and ITAG 243 V 244=1 is true, as per block 535, then the executing instruction is not a flush instruction. In that case, the executing instruction will not require a recovery operation. If PITAG 245 V 244=0 and ITAG 243 V 244=0 is true, as per block 540, then the executing instruction is a flush instruction and the previous instruction is not a flush instruction. In other words, for this case the PITAG 245 is the oldest surviving ITAG after the flush and thus requires a recovery operation.

When PITAG 245 V 246=1 and ITAG 243 V 244=0 is true, as per block 545, the RV bit is set to 1 at this location to indicate that a recovery operation will restore GPR 230 from this location, as per block 548. Processor 200 performs a test to determine if all PITAG 245 and ITAG 243 entries are examined, as per block 550. If all entries are not examined, or if the PITAG 245 and ITAG 243 tests per block 535, and 540 are true, then processor 200 examines the entry data, as per block 555. Processor 200 examines PITAG 245 V 246 and ITAG 243 V 244 data of RBU 240, as per block 530. If processor 200 examines all entries, or if the test per block 545 is not true, processor 200 reads the next RV 247 bit of RBU 240, as per block 560.

Processor 200 examines all entries in RBU 240 at flush time. After processor 200 examines all RBU 240 entries, each RBU 240 RV 247 bits are set to represent a flush event, as described above. Processor 200 initiates the recovery operation to restore GPR 230 entries to the point prior to the flush operation. An RV 247 value of 1 indicates that the RBU 240 instruction information or entry requires recovery from the flush operation. Processor 200 performs a test to determine if RBU 240 RV 247 bit=1, as per block 565. If RV 247 is not equal to 1, processor 200 reads the next RV 247 bit of RBU 240 and flow continues, as per block 560. However, if RV 247=1 is true, processor 200 reads PITAG 245, W 242, RT 214, and GPR DATA 248 from RBU 240, as per block 570.

Processor 200 writes restored GPR DATA 248, W 234, ITAG 235, and V 236 data into GPR 230, using RT 214 of RBU 240 as write address, as per block 572. Processor 200 uses the data of PITAG 245 and V 246 of RBU 240 as input into the write of ITAG 235 and V 236 of GPR 230. Processor 230 resets RV 247=0 at recovery location of current instruction of RBU 240, as per block 575. Processor 200 moves to the next instruction of RBU 240 by reading the next RBU 240 RV 247 bit again, as per block 560. Processor 200 performs a test to determine if all RV 247 bits of RBU 240 for all ITAG instruction entries =0, as per block 580. If all RV 247 bits=0 is true, processor 200 resumes dispatching instructions, as per block 582. In other words, if all instruction ITAG entries of RBU 240 demonstrate a value of RV 247=0, processor 200 resumes decoder/dispatcher 215 operation. However, if all RV 247 bits=0 is not true, processor 200 stops decoder/dispatcher 215, as per block 585. The flush operation method ends, as per block 590.

In another embodiment, a method is described below to reduce the dispatch stall penalty during the flush recovery process. While RBU 240 is recovering from a flush, such as a branch flush, decoder/dispatcher 215 may incur stall penalties or delays that may degrade the overall performance of processor 200. Each ITAG 235 entry in GPR 230 maintains a corresponding recovery pending bit RP 238 in recovery buffer unit RBU 240. The RP 238 bit may be set at flush time to indicate the particular GPR 230 entries that will need recovery after the flush. After a particular GPR 230 ITAG 235 entry recovers from a flush, processor 200 resets the recovering pending bit (RP) 238 that corresponds to that entry.

If an instruction reads data from that particular GPR 230 entry, the corresponding reset RP 238 bit informs the instruction that the particular GPR 230 ITAG 235 entry is ready for dispatch. If the particular GPR 230 entry is still recovering from a flush and is not yet complete, the corresponding RP 238 bit is set, or active. In that case, a dependent instruction will wait at decoder/dispatcher 215 until GPR 230 dependent entries recover. In other words, the dependent instruction waits or stalls until processor 200 writes restore data from RBU 240 following the flush operation. The dependent instruction sitting at the dispatch stage reads the GPR 230 RP 238 bits by using the instruction RA 231 and RB 232 operand address fields. If either the RP 238 bit for RA 231 or RB 232 is =1, then the dependent instruction must wait at the dispatch stage until that GPR 230 location is recovers from RBU 240. If both of the RP 238 bits for RA 231 and RB 232 of the instruction =0, then these GPR 230 locations are complete with recovery, or processor 200 does not require the recovery operation. When both RA 231 and RB 232=0, then the dependent instruction dispatches. After the dependent instruction dispatches, the next instruction from dispatch will read GPR 230 for RP 238 data to determine if any RP 238 bit is set for its RA 231 and RB 232 bits.

Figure 6A:
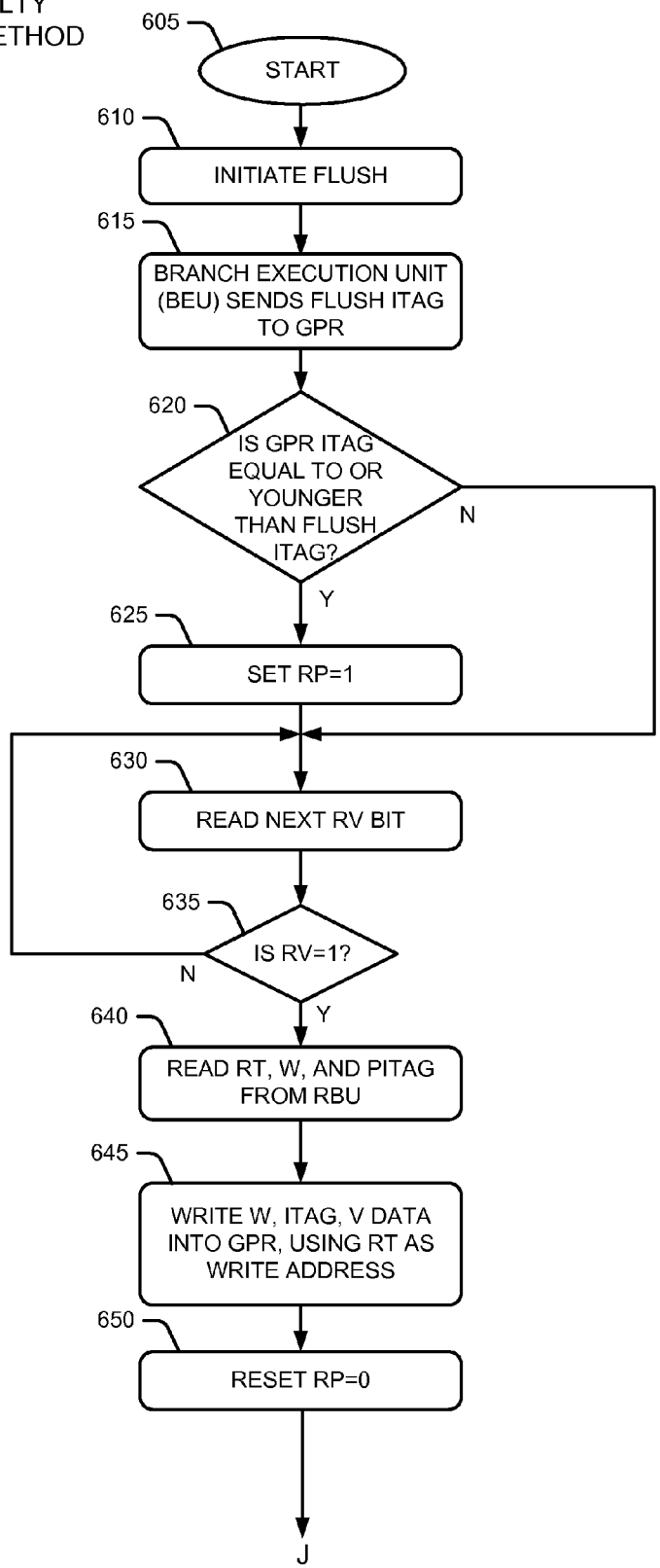
FIGS. 6A-6B is a flowchart that shows process flow in the processor of FIG. 2 as it employs the disclosed stall penalty reduction method.
Figure 6B:
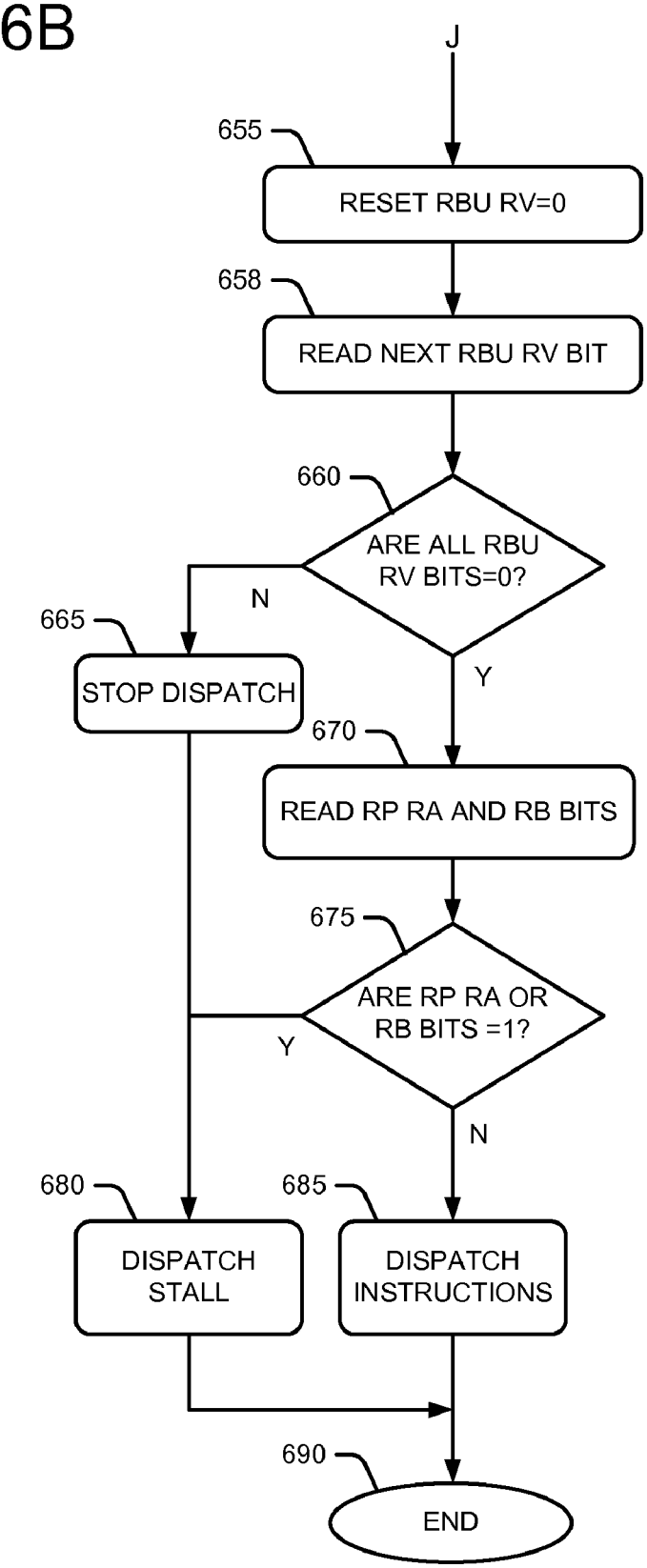

FIGS. 6A-6B show a flowchart that describes one example of the disclosed dispatch stall penalty reduction method. The stall penalty reduction method starts, as per block 605. Processor 200 initiates a flush operation in response to a branch misprediction fault, exception fault or other cause, as per block 610. In response to the flush operation, processor 200 sends FLUSH ITAG 225 from BEU 222 to GPR 230, as per block 615. Processor 200 performs a test to determine if GPR 230 ITAG 235 is equal to or younger than FLUSH ITAG 225, as per block 620. If ITAG 235 is equal to or younger than FLUSH ITAG 225, processor 200 sets recovery pending bit RP 238=1 in GPR 230, as per block 625.

If the GPR test per block 620 is not true, or after the RP 238 bit is set =1, processor 200 reads the next RBU 240 RV 247 bit, as per block 630. Processor 200 performs a test on the RV 247 bit to determine if RV 247=1, as per block 635. If RV 247 is not equal to 1, processor 200 reads the next RBU 240 RV 247 bit, as per block 630. However, if the test of RV 247=1 is true, processor 200 reads RT 214, W 242, and PITAG 245 data from RBU 240, as per block 640. Processor 200 writes W 234, ITAG 235, and V 236 data into GPR 230, using RT 214 of RBU 240 as write address, as per block 645.

Processor 200 uses the data of PITAG 245 and V 246 of RBU 240 as input into the write of ITAG 235 and V 236 of GPR 230. Processor 230 resets RP 247=0 in at corresponding instruction recovery location of GPR 230, as per block 650. Processor 230 resets RV 247=0 at recovery instruction location in RBU 240, as per block 655. Processor 200 moves to the next instruction of RBU 240 by reading the next RBU 240 RV 247 bit, as per block 658. Processor 200 performs a test to determine if all RV 247 bits=0 for all ITAG instruction entries of RBU 240, as per block 660.

If the recovery operations stops, all RV 247 bits=0, and processor 200 performs a dispatch stop, as per block 665. Processor 200 reads RP 238 RA 231 and RB 238 bits, as per block 670. In other words, while the recovery process executes, processor 200 checks the RP 238 bits for its RA 231 and RB 232 data. Processor 200 performs a test to determine if either of the RP 238 bits for its RA 231 or RB 232 is =1, as per block 675. If RA 231 or RB 232 are =1, then the instruction stalls at dispatch, as per block 680. The instruction stalls at dispatch because the RA 231 or RB 232 location is still waiting for recovery. If both of the RP 238 bits for the instruction sitting at the dispatch stage are =0, then these GPR 230 locations are not waiting for recovery, and the instruction is ready for dispatch. The next dispatching instruction will check its RP 238 bits for both RA 231 and RB 232 to determine if it is dispatch ready or not. In this manner, the flush operation will allow instructions to continue dispatching while the recovery process is executing. Processor 200 dispatches the next instruction, as per block 685. The stall penalty reduction method ends, as per block 690.

The foregoing discloses methodologies wherein a processor may employ register recovery operations after an instruction queue flush that an exception such as a branch misprediction causes. A processor within an IHS may employ ITAG and previous ITAG PITAG registers along with recovery pending RP, recovery valid RV, and other registers as temporary storage for instruction flush data. In one embodiment, the processor performs a recovery buffer unit recovery in response to, or as part of, an issue queue flush. In one embodiment, the recovery buffer unit stores pointers to a current instruction entry and previous instruction entries. The processor may quickly analyze these recovery buffer unit pointers to quickly determine an oldest entry of the recovery buffer unit that does not require recovery. The processor may use this oldest entry of the recovery buffer unit to restore the state of a general purpose register to a known good state in response to an issue queue flush.

The foregoing also discloses a methodology that may reduce dispatch stall delay after the start of an issue queue flush. A processor within an IHS may perform general purpose register recovery operations after an instruction flush operation that an exception, such as an instruction branch misprediction or other event, causes. The processor recovers the general purpose register to a useable state that existed prior to the flush operation. During the flush operation the decoder/dispatcher may stall the dispatch of an instruction until the flush operation completes. In one embodiment, the decoder/dispatcher dispatches instructions that a recovery buffer unit indicates as valid instructions during the flush operation. The recovery buffer uses recovery pending bit data at the GPR, recovery valid bits at the recovery buffer, and other register data to determine the validity of dispatching instructions. If a dispatching instruction is valid, that instruction dispatches prior to the flush operation completion. In this manner, during the flush operation, instructions continue to dispatch without causing a dispatcher stall event.

Modifications and alternative embodiments of this invention will be apparent to those skilled in the art in view of this description of the invention. Accordingly, this description teaches those skilled in the art the manner of carrying out the invention and is intended to be construed as illustrative only. The forms of the invention shown and described constitute the present embodiments. Persons skilled in the art may make various changes in the shape, size and arrangement of parts. For example, persons skilled in the art may substitute equivalent elements for the elements illustrated and described here. Moreover, persons skilled in the art after having the benefit of this description of the invention may use certain features of the invention independently of the use of other features, without departing from the scope of the invention.

What is claimed is:

1. A method of processing instructions, comprising
   fetching, by a fetch unit, a plurality of instructions from an instruction source;
   decoding the plurality of instructions, by a decoder/dispatcher, the plurality of instructions including instructions that reference a target register of a general purpose register for storage of results thereof, the instructions that reference the target register including a current instruction and previous instructions;
   dispatching, by the decoder/dispatcher, the plurality of instructions to an issue queue, issuing, by the issue queue, the plurality of instructions that reference the particular target register out-of-order to execution units;

storing a respective entry in a recovery buffer unit for each of the previous instructions and the current instruction, the previous instructions and the current instruction referencing the same target register, wherein each recovery buffer unit entry includes a first pointer to a first instruction and a second pointer to a second instruction immediately following the first instruction;

speculatively executing, by the execution units, the previous instructions and the current instruction;

determining, by a branch execution unit, if an exception occurred for one of the previous instructions that requires an issue queue flush;

performing an issue queue flush if an exception occurred in the determining step;

performing, in response to the exception, a recovery buffer unit recovery to determine an oldest valid entry of the recovery buffer unit; and restoring the general purpose register to a known good state using a result of a target register corresponding to the oldest valid entry of the recovery buffer unit determined in the recovery buffer unit recovery.

2. The method of claim 1, wherein the performing of the recovery buffer unit recovery is in response to flushing of speculatively executed instructions after a branch misprediction.

3. The method of claim 1, wherein the first instruction is a previous instruction and the second instruction is a current instruction.

4. The method of claim 3, wherein the first pointer is a previous instruction tag (PITAG) address and the second pointer is an instruction tag (ITAG) address.

5. The method of claim 3, further comprising storing a respective recovery valid bit per entry in the recovery buffer unit.

6. The method of claim 5, further comprising determining, by the recovery buffer unit, from the first and second pointers and recovery bits of the entries of the recovery buffer unit an oldest entry of the recovery buffer unit that does not require recovery in response to the exception.

7. The method of claim 6, further comprising writing to the general purpose register with information from the oldest entry of the recovery buffer unit that does not require recovery in response to the exception, thus restoring the general purpose register to a known good state.

8. A processor, comprising:
a fetch unit that fetches a plurality of instructions from an instruction source;
a decoder/dispatcher that decodes the plurality of instructions, the plurality of instructions including instructions that reference a target register of a general purpose register for storage of results thereof, the instructions that reference the target register including a current instruction and previous instructions, wherein the decoder/dispatcher dispatches the plurality of instructions to an issue queue that is coupled to the dispatcher;
a general purpose register, coupled to the dispatcher, that stores a state of the processor;
a plurality of execution units, coupled to the issue queue, wherein the issue queue issues the plurality of instructions that reference the particular target register out-of-order to the execution units;
a recovery buffer unit, coupled to the general purpose register, that stores a respective entry for each of the previous instructions and the current instruction, the previous instructions and the current instruction referencing the same target register, wherein the execution units speculatively execute the previous instructions and the current instruction, wherein each recovery buffer unit entry includes a first pointer to a first instruction and a second pointer to a second instruction immediately following the first instruction;
a branch execution unit, coupled to the issue queue, that determines if an exception occurred for one of the previous instructions that requires an issue queue flush, wherein the issue queue performs an issue queue flush if the exception occurred; and
wherein the recovery buffer unit, in response to the issue queue flush, performs a recovery buffer unit recovery to determine an oldest valid entry of the recovery buffer unit, the recovery buffer unit restoring the general purpose register to a known good state using the result of a target register corresponding to the oldest valid entry of the recovery buffer unit.

9. The processor of claim 8, wherein the processor performs a recovery buffer unit recovery is in response to the flushing of speculatively executed instructions after a branch misprediction.

10. The processor of claim 8, wherein the first instruction is a previous instruction and the second instruction is a current instruction.

11. The processor of claim 10, wherein the first pointer is a previous instruction tag (PITAG) address and the second pointer is an instruction tag (ITAG) address.

12. The processor of claim 10, wherein the processor stores a respective recovery valid bit per entry in the recovery buffer unit.

13. The processor of claim 12, further comprising determining, by the recovery buffer unit, from the first and second pointers and recovery bits of the entries of the recovery buffer unit an oldest entry of the recovery buffer unit that does not require recovery in response to the exception.

14. The processor of claim 13, wherein the recovery buffer unit writes into the general purpose register information from the oldest entry of the recovery buffer unit that does not require recovery in response to the exception, thus restoring the general purpose register to a known good state.

15. An information handling system (IHS), comprising:
a memory;
a processor, coupled to the memory, the processor including:
a fetch unit that fetches a plurality of instructions from an instruction source;
a decoder/dispatcher that decodes the plurality of instructions, the plurality of instructions including instructions that reference a target register of a general purpose register for storage of results thereof, the instructions that reference the target register including a current instruction and previous instructions, wherein the decoder/dispatcher dispatches the plurality of instructions to an issue queue that is coupled to the dispatcher;
a general purpose register, coupled to the dispatcher, that stores a state of the processor;
a plurality of execution units, coupled to the issue queue, wherein the issue queue issues the plurality of instructions that reference the particular target register out-of-order to the execution units;
a recovery buffer unit, coupled to the general purpose register, that stores a respective entry for each of the previous instructions and the current instruction, the previous instructions and the current instruction referencing the same target register, wherein the execution units speculatively execute the previous instructions and the current instruction , wherein each recovery buffer unit entry includes a first pointer to a first instruction and a second pointer to a second instruction immediately following the first instruction;

a branch execution unit, coupled to the issue queue, that determines if an exception occurred for one of the previous instructions that requires an issue queue flush, wherein the issue queue performs an issue queue flush if the exception occurred; and wherein the recovery buffer unit, in response to the issue queue flush, performs a recovery buffer unit recovery to determine an oldest valid entry of the recovery buffer unit, the recovery buffer unit restoring the general purpose register to a known good state using the result of a target register corresponding to the oldest valid entry of the recovery buffer unit.

16. The IHS of claim 15, wherein the IHS performs a recovery buffer unit recovery is in response to the flushing of speculatively executed instructions after a branch misprediction.

17. The IHS of claim 15, wherein the first instruction is a previous instruction and the second instruction is a current instruction.

18. The IHS of claim 17, wherein the first pointer is a previous instruction tag (PITAG) address and the second pointer is an instruction tag (ITAG) address.

19. The IHS of claim 17, wherein the processor stores a respective recovery valid bit per entry in the recovery buffer unit.

20. The IHS of claim 19, further comprising determining, by the recovery buffer unit, from the first and second pointers and recovery bits of the entries of the recovery buffer unit an oldest entry of the recovery buffer unit that does not require recovery in response to the exception.

21. The IHS of claim 20, wherein the recovery buffer unit writes into the general purpose register information from the oldest entry of the recovery buffer unit that does not require recovery in response to the exception, thus restoring the general purpose register to a known good state.

* * * * *